(12) United States Patent
Hoke et al.

(10) Patent No.: US 10,844,790 B2
(45) Date of Patent: Nov. 24, 2020

(54) FUEL DISTRIBUTION WITHIN A GAS TURBINE ENGINE COMBUSTOR

(71) Applicant: United Technologies Corporation, Farmington, CT (US)

(72) Inventors: James B. Hoke, Tolland, CT (US); Timothy S. Snyder, Glastonbury, CT (US); David Kwoka, South Glastonbury, CT (US); Robert M. Sonntag, Bolton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 170 days.

(21) Appl. No.: 16/270,226

(22) Filed: Feb. 7, 2019

(65) Prior Publication Data

US 2020/0025090 A1 Jan. 23, 2020

Related U.S. Application Data

(63) Continuation of application No. 13/832,507, filed on Mar. 15, 2013, now Pat. No. 10,240,533, which is a continuation-in-part of application No. 13/301,856, filed on Nov. 22, 2011, now Pat. No. 9,631,560.

(60) Provisional application No. 61/706,908, filed on Sep. 28, 2012.

(51) Int. Cl.
*F02C 7/22* (2006.01)
*F02C 7/228* (2006.01)
*F02C 9/28* (2006.01)

(52) U.S. Cl.
CPC ............... *F02C 7/222* (2013.01); *F02C 7/22* (2013.01); *F02C 7/228* (2013.01); *F02C 9/28* (2013.01)

(58) Field of Classification Search
CPC ...... F23R 3/34; F23R 3/28; F02C 7/22; F02C 7/228; F02C 7/232; F02C 9/28
See application file for complete search history.

(56) References Cited

U.S. PATENT DOCUMENTS

| 4,027,473 A | 6/1977 | Baker |
| 5,036,657 A | 8/1991 | Seto et al. |
| 5,205,116 A | 4/1993 | Ng |
| 5,345,757 A | 9/1994 | MacLean et al. |

(Continued)

OTHER PUBLICATIONS

International Preliminary Report on Patentability for PCT Application No. PCT/US2013/061126, dated Apr. 9, 2015.

(Continued)

*Primary Examiner* — Steven M Sutherland
(74) *Attorney, Agent, or Firm* — Carlson, Gaskey & Olds, P.C.

(57) ABSTRACT

A fuel system for a gas turbine engine includes a plurality of duplex nozzles arranged on each side of top dead center and a plurality of simplex nozzles. A primary manifold is operable to communicate fuel to a primary flow jet in each of the plurality of duplex nozzles and a secondary manifold is operable to communicate fuel to a secondary flow jet in each of the plurality of duplex nozzles and a secondary flow jet in each of the plurality of simplex nozzles. An equalizer valve that is in communication with both the primary manifold and the secondary manifold distributes fuel at various pressures to both the primary and secondary manifolds.

18 Claims, 5 Drawing Sheets

(56) References Cited

U.S. PATENT DOCUMENTS

| | | | |
|---|---|---|---|
| 5,402,634 A * | 4/1995 | Marshall | F23R 3/346 |
| | | | 60/776 |
| 5,848,525 A | 12/1998 | Spencer | |
| 5,884,483 A * | 3/1999 | Munro | F02C 7/22 |
| | | | 60/734 |
| 6,666,029 B2 | 12/2003 | Ryan | |
| 6,786,049 B2 | 9/2004 | Parsons et al. | |
| 6,857,272 B2 | 2/2005 | Summerfield et al. | |
| 6,915,638 B2 | 7/2005 | Runkle et al. | |
| 6,945,053 B2 | 9/2005 | Von Der Bank | |
| 6,968,699 B2 | 11/2005 | Howell et al. | |
| 7,484,352 B2 | 2/2009 | Flohr et al. | |
| 7,540,141 B2 | 6/2009 | Goldberg et al. | |
| 7,966,995 B2 | 6/2011 | Futa, Jr. et al. | |
| 8,037,688 B2 | 10/2011 | Hagan et al. | |
| 2007/0130911 A1 | 6/2007 | Goldberg et al. | |
| 2009/0077973 A1 | 3/2009 | Hu et al. | |
| 2010/0058770 A1 | 3/2010 | Ryan | |

OTHER PUBLICATIONS

International Search Report and Written Opinion for PCT Application No. PCT/US2013/061126, dated Dec. 17, 2013.

\* cited by examiner

FUEL DISTRIBUTION WITHIN A GAS TURBINE ENGINE COMBUSTOR

CROSS REFERENCE TO RELATED APPLICATIONS

This application is a continuation of U.S. patent application Ser. No. 13/832,507, filed on Mar. 15, 2013, which is a continuation in part of U.S. patent application Ser. No. 13/301,856 filed on Nov. 22, 2011, now U.S. Pat. No. 9,631,560 issued on Apr. 25, 2017, and also claims priority to U.S. Provisional Patent Application No. 61/706,908 filed on Sep. 28, 2012.

BACKGROUND

Gas turbine engines, such as those which power modern commercial and military aircraft, generally include a compressor for pressurizing an airflow, a combustor for burning a hydrocarbon fuel in the presence of the pressurized air, and a turbine for extracting energy from the resultant combustion gases. The combustor generally includes radially spaced inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed nozzles project into a forward section of the combustion chamber through a respective nozzle guide to supply the fuel to be mixed with the pressurized air.

It remains desirable for gas turbine engine manufacturers to develop combustor configurations that reduce emissions and noise with improved operational efficiencies.

SUMMARY

A fuel system for a gas turbine engine according to an exemplary embodiment of this disclosure, among other possible things includes a plurality of duplex nozzles arranged on each side of top dead center, a plurality of simplex nozzles, a primary manifold operable to communicate fuel to a primary flow jet in each of the plurality of duplex nozzles, a secondary manifold operable to communicate fuel to a secondary flow jet in each of the plurality of duplex nozzles and a secondary flow jet in each of the plurality of simplex nozzles, and an equalizer valve in communication with the primary manifold and the secondary manifold. The equalizer valve is movable between an open position and a closed position, the closed position is operable to permit a supply of fuel pressure to the primary manifold that is greater than fuel pressure to the secondary manifold, and the open position is operable to permit supply of fuel pressure to the primary manifold with essentially an equal fuel pressure as the secondary manifold.

In a further embodiment of the foregoing fuel system, the plurality of duplex nozzles are arranged with respect to a fuel igniter.

In a further embodiment of any of the foregoing fuel systems, at least one of the plurality of duplex nozzles are arranged adjacent to a fuel igniter.

In a further embodiment of any of the foregoing fuel systems, at least one of the plurality of duplex nozzles are arranged opposite the fuel igniter.

In a further embodiment of any of the foregoing fuel systems, the primary flow jet in each of the plurality of duplex nozzles is surrounded by the secondary flow jet.

In a further embodiment of any of the foregoing fuel systems, the plurality of duplex nozzles include ten (10) duplex nozzles and the plurality of simplex nozzles includes six (6) simplex nozzles.

In a further embodiment of any of the foregoing fuel systems, the plurality of simplex nozzles includes simplex nozzles arranged on either side of a bottom dead center position.

A method of noise control from a combustor of a gas turbine engine according to an exemplary embodiment of this disclosure, among other possible things includes selectively forming a plurality of local circumferential zones with different fuel-air ratios within the combustor including forming a high fuel-air ratio circumferential zone at a top dead center position and forming a low fuel-air ratio circumferential zone at a bottom dead center position.

In a further embodiment of the foregoing method, further including alternating the local circumferential zones with varied fuel-air ratios.

In a further embodiment of any of the foregoing methods, further including forming the local circumferential zones as a high-low-high-low local fuel-air ratios.

In a further embodiment of any of the foregoing methods, further including locating at least one of a plurality of duplex nozzles adjacent to a fuel igniter to form at least one high local fuel-air ratio within at least one of the plurality of circumferential zones.

In a further embodiment of any of the foregoing methods, further including locating at least one of the plurality of duplex nozzles opposite the fuel igniter to form at least one high local fuel-air ratio within at least one of the plurality of circumferential zones.

In a further embodiment of any of the foregoing methods, further includes alternating a plurality of duplex nozzles and a plurality of simplex nozzles to define the plurality of circumferential zones wherein the plurality of duplex nozzles includes ten (10) duplex nozzles and the plurality of simplex nozzles includes six (6) simplex nozzles.

In a further embodiment of any of the foregoing methods, further including selectively equalizing a fuel pressure between a primary manifold and a secondary manifold, the primary manifold in communication with a primary flow jet in each of the plurality of duplex nozzles and the secondary manifold in communication with a secondary flow jet in each of the plurality of duplex nozzles and a secondary flow jet in each of the plurality of simplex nozzles.

In a further embodiment of any of the foregoing methods, further including selectively opening a valve between the primary manifold and the secondary manifold.

In a further embodiment of any of the foregoing methods, further including selectively equalizing the fuel pressure in response to a non-low power conditions.

In a further embodiment of any of the foregoing methods, further including selectively dividing a fuel pressure between a primary manifold and a secondary manifold, the primary manifold in communication with a primary flow jet in each of the plurality of duplex nozzles and the secondary manifold in communication with a secondary flow jet in each of the plurality of duplex nozzles and a secondary flow jet in each of the plurality of simplex nozzles.

In a further embodiment of any of the foregoing methods, further including selectively dividing the fuel pressure in response to a low power conditions.

In a further embodiment of any of the foregoing methods, the low power condition includes the power required for approach conditions and a margin above at least partially into a cruise condition.

In a further embodiment of any of the foregoing methods, further including selectively forming the plurality of local circumferential zones with varied fuel-air ratios within the combustor in response to a low power condition.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
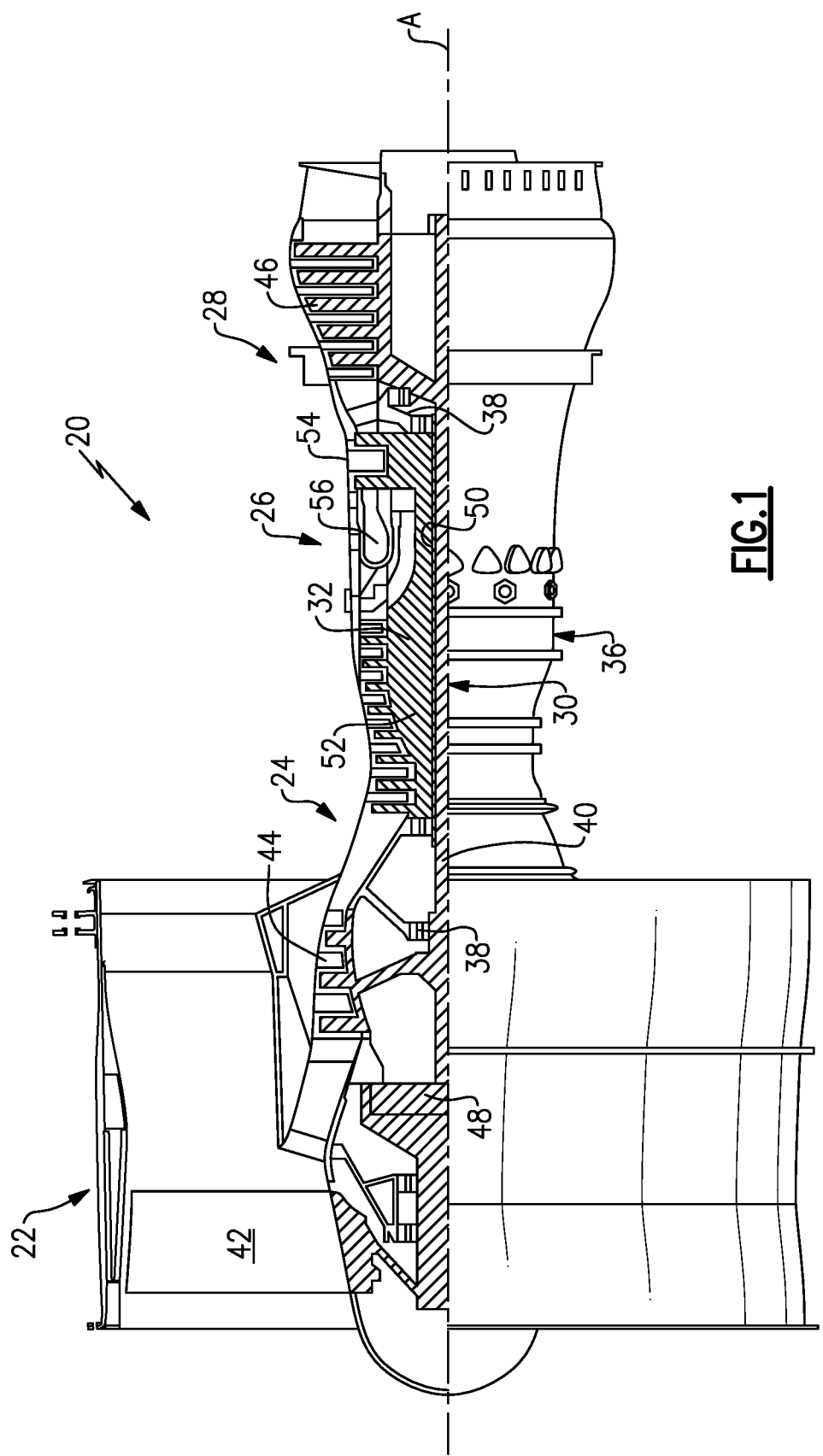
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel within the combustor 56, then expanded over the high pressure turbine 54 and low pressure turbine 46. The turbines 54, 46 rotationally drive the respective low speed spool 30 and high speed spool 32 in response to the expansion.

Figure 2:
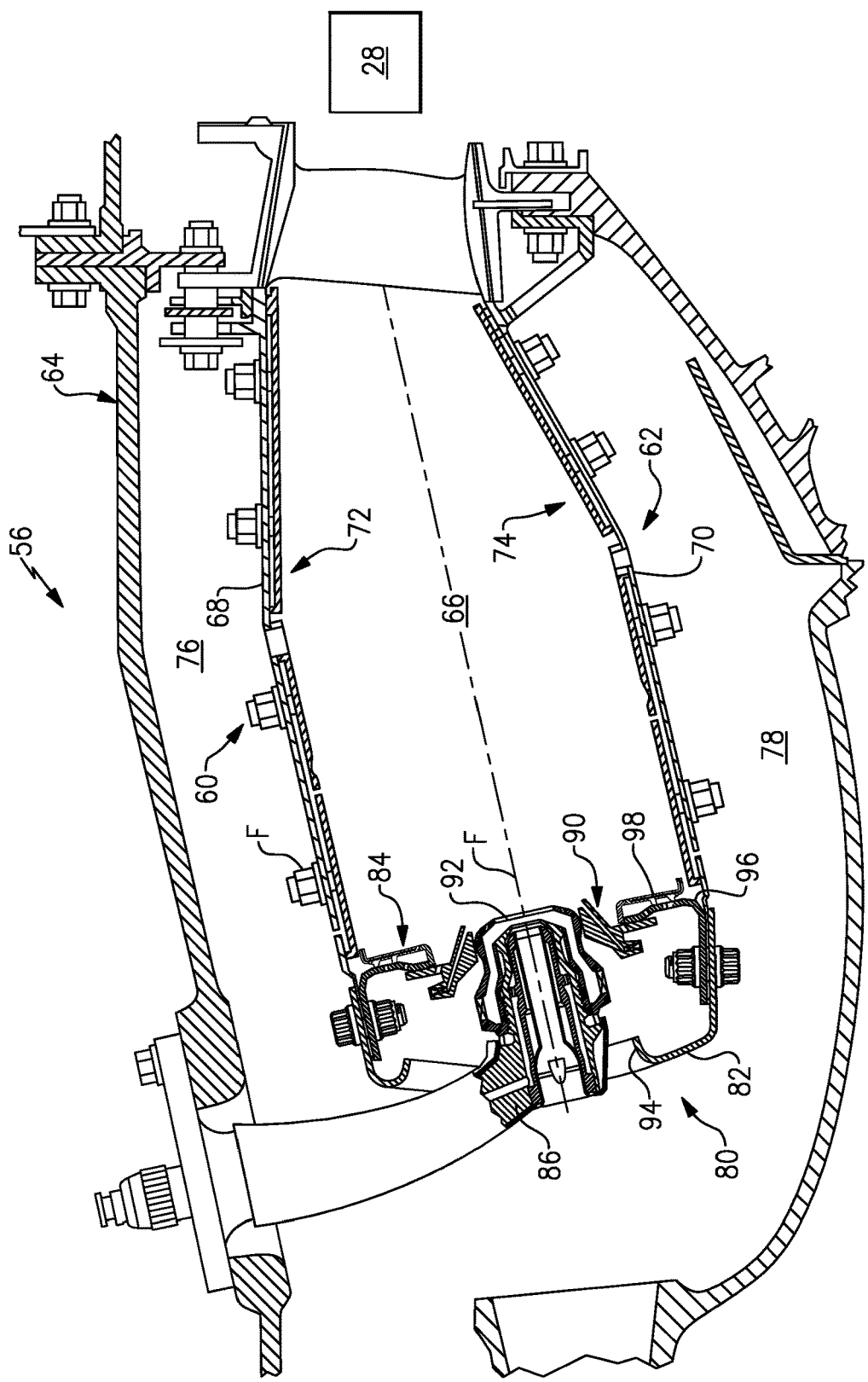
FIG. 2 is a partial sectional view of an exemplary annular combustor that may be used with the gas turbine engine shown in FIG. 1.

With reference to FIG. 2, the combustor 56 generally includes an outer liner 60 and an inner liner 62 disposed within a combustor case 64. An annular combustion chamber 66 is defined between the outer liner 60 and the inner liner 62. It should be understood that although a particular combustor is illustrated, other combustor types with various liner panel arrangements will also benefit herefrom.

The outer liner 60 and the combustor case 64 define an outer annular plenum 76 and the inner liner 62 and the combustor case 64 define an inner annular plenum 78. The liners 60, 62 contain the flame for direction toward the turbine section 28. Each liner 60, 62 generally includes a support shell 68, 70 which supports one or more liner panels 72, 74 mounted to a hot side of the respective support shell 68, 70. The liner panels 72, 74 define a liner panel array which may be generally annular in shape. Each of the liner panels 72, 74 may be generally rectilinear and manufactured of, for example, a nickel based super alloy or ceramic material.

The combustor 56 further includes a forward assembly 80 immediately downstream of the compressor section 24 to receive compressed airflow therefrom. The forward assembly 80 generally includes an annular hood 82, a bulkhead assembly 84, a multiple of nozzles 86 (one shown) and a multiple of nozzle guides 90 (one shown) that defines a central opening 92. The annular hood 82 extends radially between, and is secured to, the forwardmost ends of the liners 60, 62. The annular hood 82 includes a multiple of circumferentially distributed hood ports 94 that accommodate the respective nozzle 86 and introduce air into the forward end of the combustion chamber 66. Each nozzle 86 projects through one of the hood ports 94 and through the central opening 92 within the respective nozzle guide 90 along a nozzle axis F.

Figure 3:
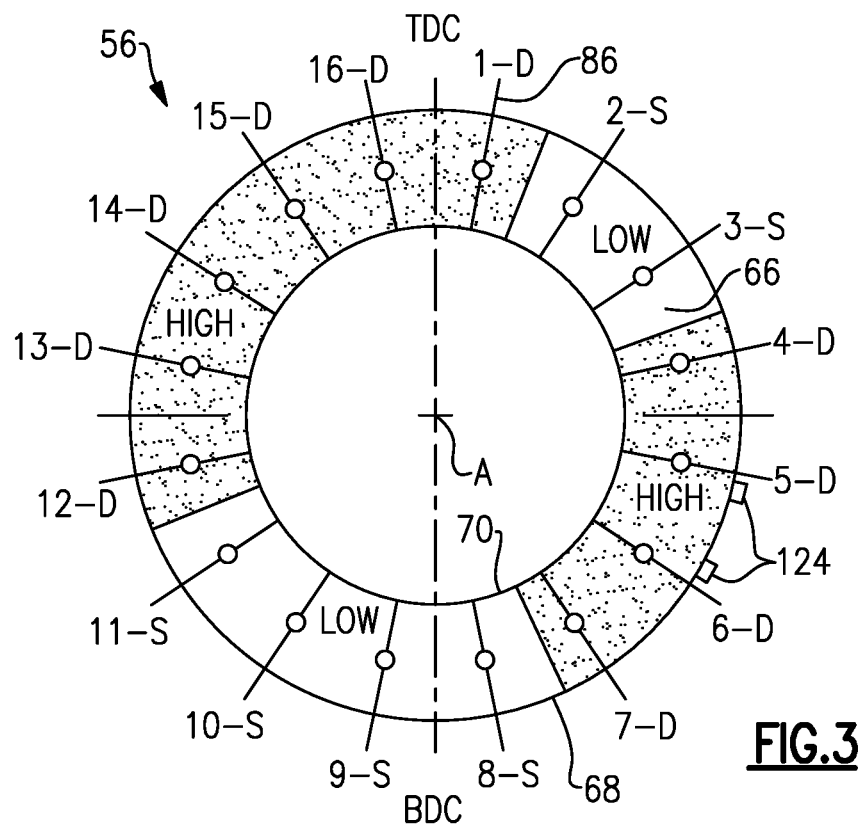
FIG. 3 is a schematic view of the exemplary combustor.

With reference to FIG. 3, the multiple of nozzles 86 (sixteen shown) are arranged to supply fuel to the combustor 56. The multiple of nozzles 86 and surrounding structure generate a swirling, intimately blended fuel-air mixture that supports combustion in the forward section of the combustion chamber 66.

Airflow in the combustor 56 is generally uniform and fuel-air variation in the disclosed non-limiting embodiment is selectively generated by the multiple of nozzles 86. More specifically, the variation is selectively generated through a plurality of duplex nozzles 86D (one shown in FIG. 4) and a plurality of simplex nozzles 86S (one shown in FIG. 5).

In the example embodiment, ten (10) duplex nozzles 86D and six (6) simplex nozzles 86S are provided to provide the desired uniformity at high power settings. Moreover, duplex nozzles 86D provided at the top dead center TDC location, schematically shown at 16-D and 1-D provide enhanced stability and to facilitate starting. The example disclosed configuration including the duplex nozzles 86D at the 16-D and 1-D positions provides improvements in noise and tones generated by the combustor 56 during operation.

Figure 4:
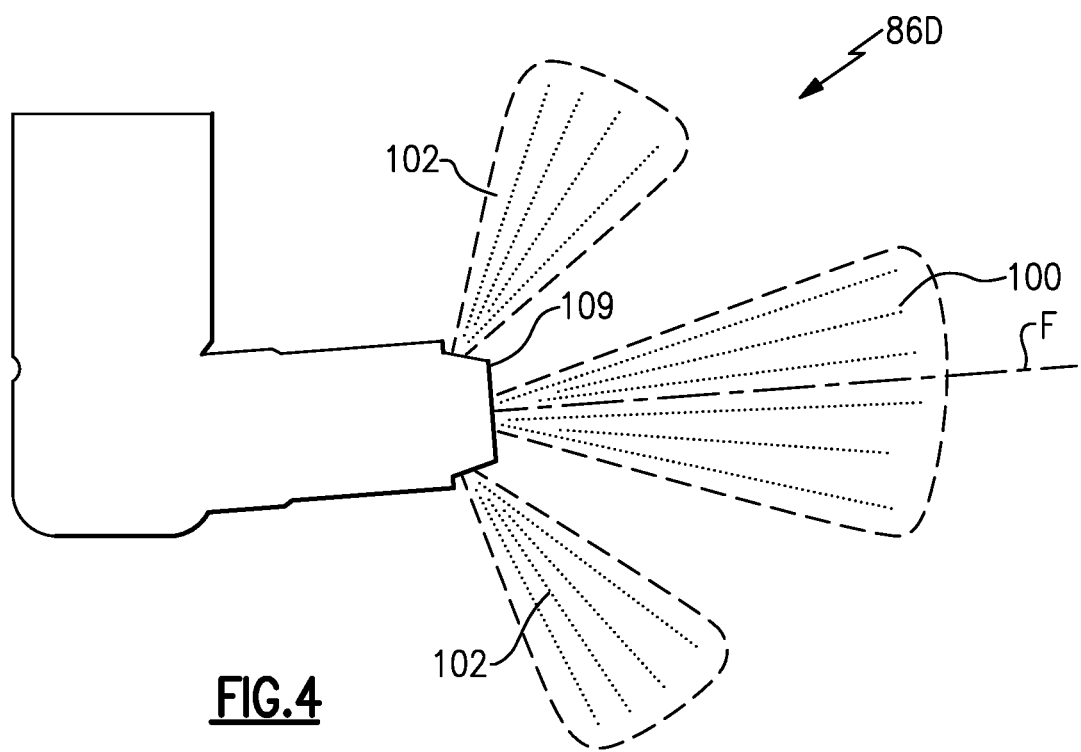
FIG. 4 is a schematic view of a duplex nozzle.
Figure 5:
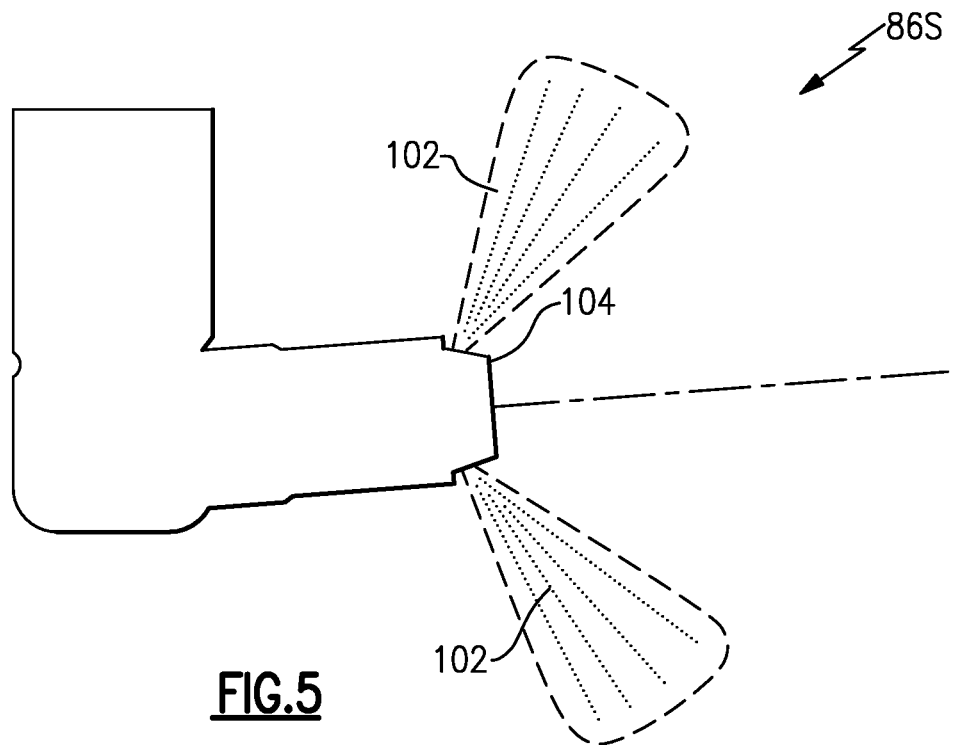
FIG. 5 is a schematic view of a simplex nozzle.

With reference to FIG. 4, each of the duplex nozzles 86D include a primary flow jet 100 and secondary flow jets 102. The primary flow jet 100 is defined generally along axis F and the secondary flow jets 102 are generally transverse to axis F. Each of the simplex nozzles 86S include only the secondary flow jets 102 (FIG. 5). It should be appreciated that various jet arrangements may alternatively or additionally be provided.

Figure 6:
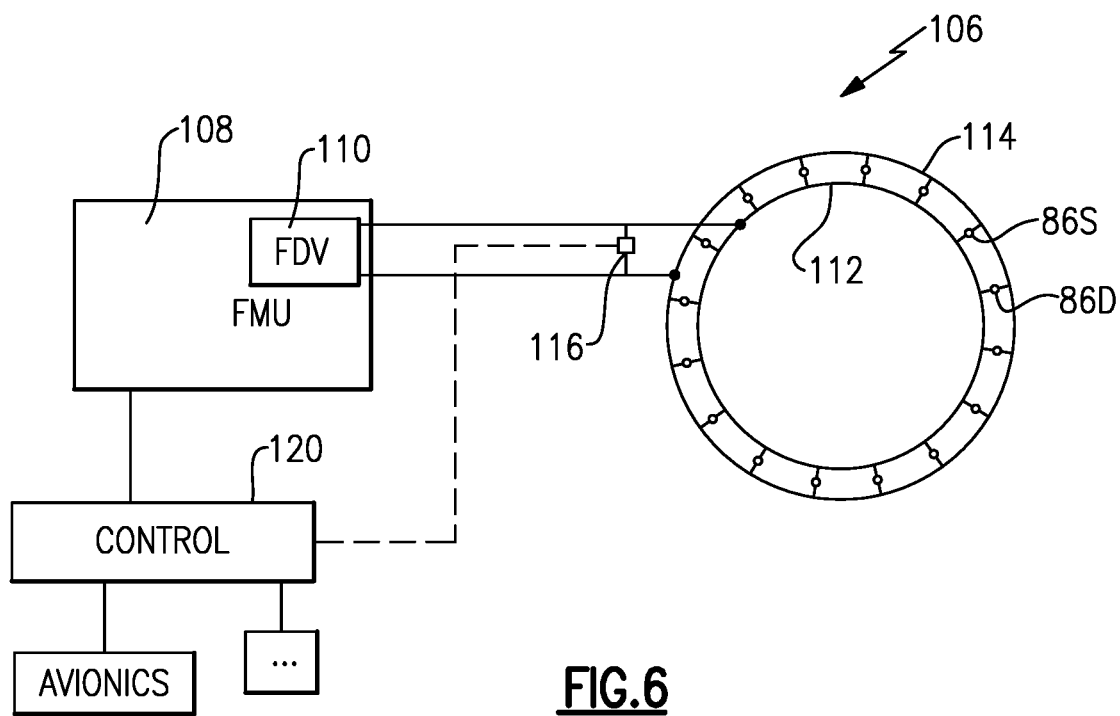
FIG. 6 is a schematic view of a fuel system for the exemplary combustor.

With reference to FIG. 6, a fuel system 106 communicates fuel to the multiple of nozzles 86. The fuel system generally includes a fuel metering unit (FMU) 108, a flow divider valve (FDV) 110, a primary manifold 112, a secondary manifold 114, and an equalizing valve 116 which selectively permits fuel communication between the primary manifold 112 and the secondary manifold 114. The fuel metering unit (FMU) 108 is a hydromechanical unit that controls fuel flow and the flow divider valve (FDV) 110 proportions the fuel flow to the primary manifold 112 and the secondary manifold 114. The primary manifold 112 communicates fuel to the primary flow jet 100 in each of the duplex nozzles 86D and the secondary flow manifold 114 communicates fuel to the secondary flow jets 102 in each of the duplex nozzles 86D and each of the simplex nozzles 86S.

Figure 7:
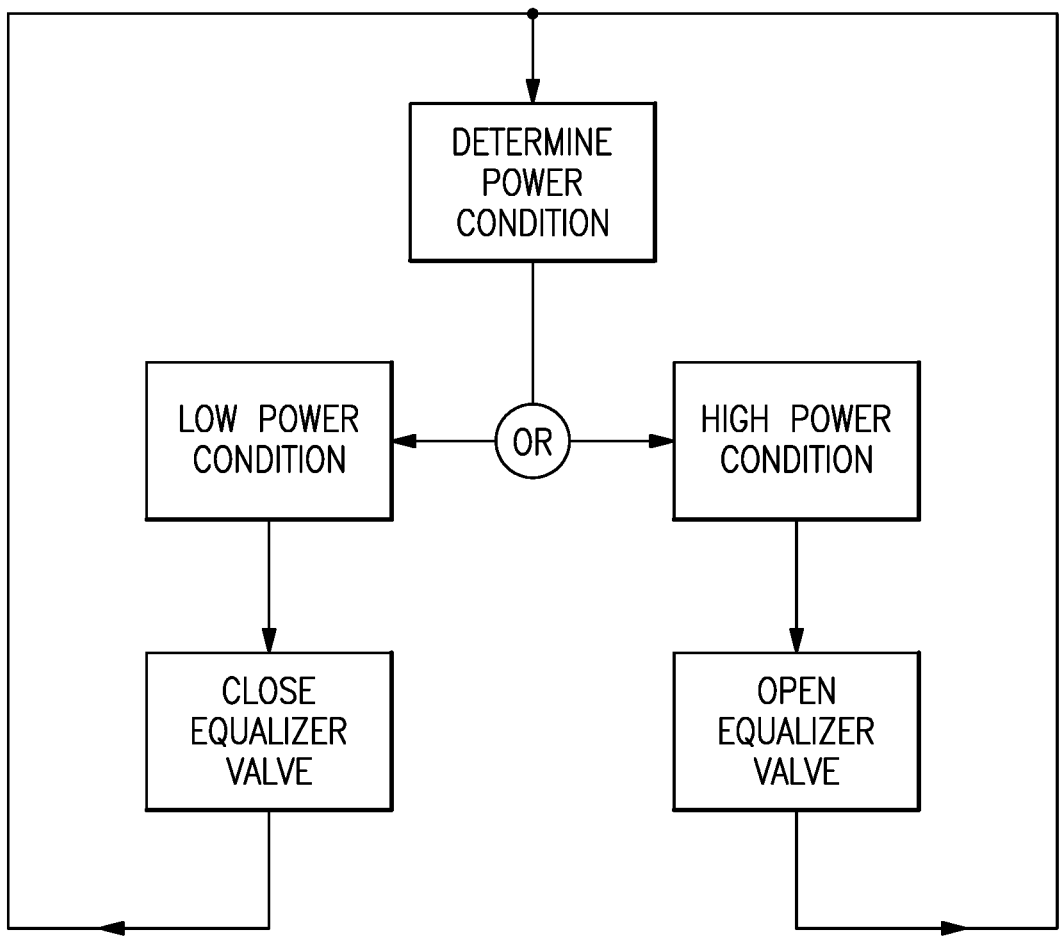
FIG. 7 is a schematic view of a method of operation of the fuel system.

A module 120 executes a fuel control algorithm 122 (FIG. 7). The functions of the algorithm 122 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the module 120 may be a portion of a flight control computer, a portion of a Full Authority Digital Engine Control (FDEC) or other system.

The module 120 typically includes a processor, a memory, and an interface. The processor may be any type of known microprocessor having desired performance characteristics. The memory may, for example only, include computer readable medium which stores the data and control algorithms described herein. The interface facilitates communication with the fuel metering unit (FMU) 108, the equalizing valve 116, as well as other avionics and systems.

Reduction in tone amplitude has been demonstrated through the formation of local circumferential zones with different fuel-air ratio mixtures. The different fuel-air ratio mixtures in the alternating circumferential zones as defined by the nozzles 86D, 86S (FIG. 3) vary the delay time of heat release, and consequently provide a differential coupling to the associated naturally occurring acoustic frequencies. That is, high-low-high-low local fuel-air ratios are defined about the circumference of the combustor 56.

The fuel system 106 locates the duplex nozzles 86D adjacent to a set of fuel igniters 124 and opposite the set of fuel igniters 124 (FIG. 3). It should be appreciated that the fuel igniters 124 may be located in other circumferential positions and the duplex nozzles 86D would be adjusted in accordance therewith. That is, if the fuel igniters 124 were mounted at bottom dead center (BDC) at positions 8 and 9, for example, the duplex nozzles 86D would be located in positions 7-10 and 15-2. In the disclosed, non-limiting embodiment of sixteen (16) nozzles 86 where each of the nozzles 86 are separated by 22.5 degrees, the duplex nozzles 86D are located in positions 1, 4-7 and 12-16 while positions 8-11, 2 and 3 utilize simplex nozzles 86S. The example duplex nozzles 86D are therefore located on either side of the top dead center (TDC) at positions 16 and 1. Moreover, in the disclosed example, simplex nozzles 86S are arranged on either side of BDC at positions 8 and 9.

At low power conditions, the equalizing valve 116 is closed such that the primary manifold 112 is provided with greater fuel pressure than the secondary manifold 114 to drive a fuel flow distortion. The increased fuel pressure drop (and fuel flow) increases the overall (primary plus secondary) fuel flow to the duplex nozzles 86D in relation to the simplex nozzles 86S. That is, when the equalizing valve 116 is closed, the duplex nozzles 86D generate the relatively high fuel-air ratio mixtures and the simplex nozzles 86S provide the relatively low fuel-air ratio mixtures. The varied fuel-air ratio mixtures dampen tangential and axial pressure waves within the combustor 56 to control combustor tones and enhance combustor stability. In one example in which the FMU 108 supplies fuel at approximately 100 psi at a low power condition and approximately 1200 psi at a high power condition, an approximate 50-150 psi difference is provided between the duplex nozzles 86D and the simplex nozzles 86S when the equalizing valve 116 is closed. It should be appreciate that "low power" as defined herein may include moderate power such as that required for approach conditions and a margin above at least partially into a cruise condition.

At non-low power conditions, the equalizing valve 116 is open such that the primary manifold 112 and the secondary flow manifold 114 receive equalized flow such that the duplex nozzles 86D and the simplex nozzles 86S generate a symmetric uniform fuel-air ratio throughout the combustor 56. It should be appreciated that "non-low power" as defined herein may include cruise power conditions and above such as a take-off flight condition.

The equalizing valve 116 allows the selection of fuel asymmetry at low power conditions where combustor tones predominate and reversion to symmetric operation at high power conditions where uniform fuel-air ratio mixture distribution is desired. The local fuel-air mixture ratio control further facilitates enhanced stability for snap transient decelerations. Selective operation of the equalizing valve 116 thereby reduces tone amplitudes over, for example, idle and approach power settings so that community and aircraft cabin noise are minimized yet selectively permits symmetric high power operation during, for example, cruise power settings to enhance downstream turbine durability. Additionally, fuel flow through the primary manifold may be increased to further mitigate specific tones and noise frequencies that may be generated during operation.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fuel system for a gas turbine engine comprising:
a plurality of duplex nozzles, wherein the plurality of duplex nozzles are positioned circumferentially about an engine longitudinal axis and at least two of the plurality of duplex nozzles are positioned on either side of a top center position on a common side of the engine longitudinal axis;
a plurality of simplex nozzles, wherein the plurality of simplex nozzles includes at least two simplex nozzles arranged on either side of a bottom center position on a side of the engine longitudinal axis opposite the top center position and the at least two of the plurality of duplex nozzles positioned on either side of the top center position;
a primary manifold operable to communicate fuel to a primary flow jet in each of the plurality of duplex nozzles;
a secondary manifold operable to communicate fuel to a secondary flow jet in each of the plurality of duplex nozzles and a secondary flow jet in each of the plurality of simplex nozzles; and
an equalizer valve in communication with the primary manifold and the secondary manifold, the equalizer valve movable between an open position and a closed position, the closed position is operable to permit a supply of fuel pressure to the primary manifold that is greater than fuel pressure to the secondary manifold, and the open position is operable to permit supply of fuel pressure to the primary manifold with essentially an equal fuel pressure as the secondary manifold.

2. The fuel system as recited in claim 1, wherein the plurality of duplex nozzles are arranged with respect to a fuel igniter.

3. The fuel system as recited in claim 1, wherein at least one of the plurality of duplex nozzles are arranged adjacent to a fuel igniter.

4. The fuel system as recited in claim 3, wherein at least one of the plurality of duplex nozzles are arranged opposite the fuel igniter.

5. The fuel system as recited in claim 1, wherein the primary flow jet in each of the plurality of duplex nozzles is surrounded by the secondary flow jet.

6. The fuel system as recited in claim 1, wherein the plurality of duplex nozzles comprise ten (10) duplex nozzles and the plurality of simplex nozzles comprises six (6) simplex nozzles.

7. The fuel system as recited in claim 6, wherein at least two simplex nozzles are arranged next to each other and between at least two of the duplex nozzles.

8. The fuel system as recited in claim 6, wherein the plurality of duplex nozzles comprise a first group of six duplex nozzles and a second group of four simplex nozzles with at least one of the plurality of simplex nozzles disposed between the first group of six duplex nozzles and the second group of for simplex nozzles.

9. The fuel system as recited in claim 8, wherein the plurality of simplex nozzles comprises a first group of two simplex nozzles and a second group of four simplex nozzles.

10. The fuel system as recited in claim 9, wherein the second group of four simplex nozzles includes the at least two simplex nozzles arranged on either side of the bottom center position.

11. The fuel system as recited in claim 10, wherein the first group of six duplex nozzles includes the at least two duplex nozzles disposed on either side of the top dead center position.

12. A fuel system for a gas turbine engine comprising:
a plurality of duplex nozzles;
a plurality of simplex nozzles, wherein the plurality of duplex nozzles comprise ten (10) duplex nozzles and the plurality of simplex nozzles comprises six (6) simplex nozzles;
a primary manifold operable to communicate fuel to a primary flow jet in each of the plurality of duplex nozzles;
a secondary manifold operable to communicate fuel to a secondary flow jet in each of the plurality of duplex nozzles and a secondary flow jet in each of the plurality of simplex nozzles; and
an equalizer valve in communication with the primary manifold and the secondary manifold, the equalizer valve movable between an open position and a closed position, the closed position is operable to permit a supply of fuel pressure to the primary manifold that is greater than fuel pressure to the secondary manifold, and the open position is operable to permit supply of fuel pressure to the primary manifold with essentially an equal fuel pressure as the secondary manifold.

13. The fuel system as recited in claim 12, wherein the plurality of simplex nozzles are arranged about a longitudinal axis of the engine and the plurality of simplex nozzles includes simplex nozzles arranged on either side of a bottom center position on an opposite side of the longitudinal axis of the engine from at least two of the plurality of duplex nozzles positioned on either side of a top center position.

14. The fuel system as recited in claim 13, wherein at least two simplex nozzles are arranged next to each other and between at least two of the duplex nozzles.

15. The fuel system as recited in claim 13, wherein the plurality of duplex nozzles comprise a first group of six duplex nozzles and a second group of four simplex nozzles with at least one of the plurality of simplex nozzles disposed between the first group of six duplex nozzles and the second group of for simplex nozzles.

16. The fuel system as recited in claim 15, wherein the plurality of simplex nozzles comprises a first group of two simplex nozzles and a second group of four simplex nozzles.

17. The fuel system as recited in claim 16, wherein the second group of four simplex nozzles includes the at least two simplex nozzles arranged on either side of the bottom center position.

18. The fuel system as recited in claim 17, wherein the first group of six duplex nozzles includes the at least two duplex nozzles disposed on either side of the top dead center position.

* * * * *